Patented Nov. 20, 1928.

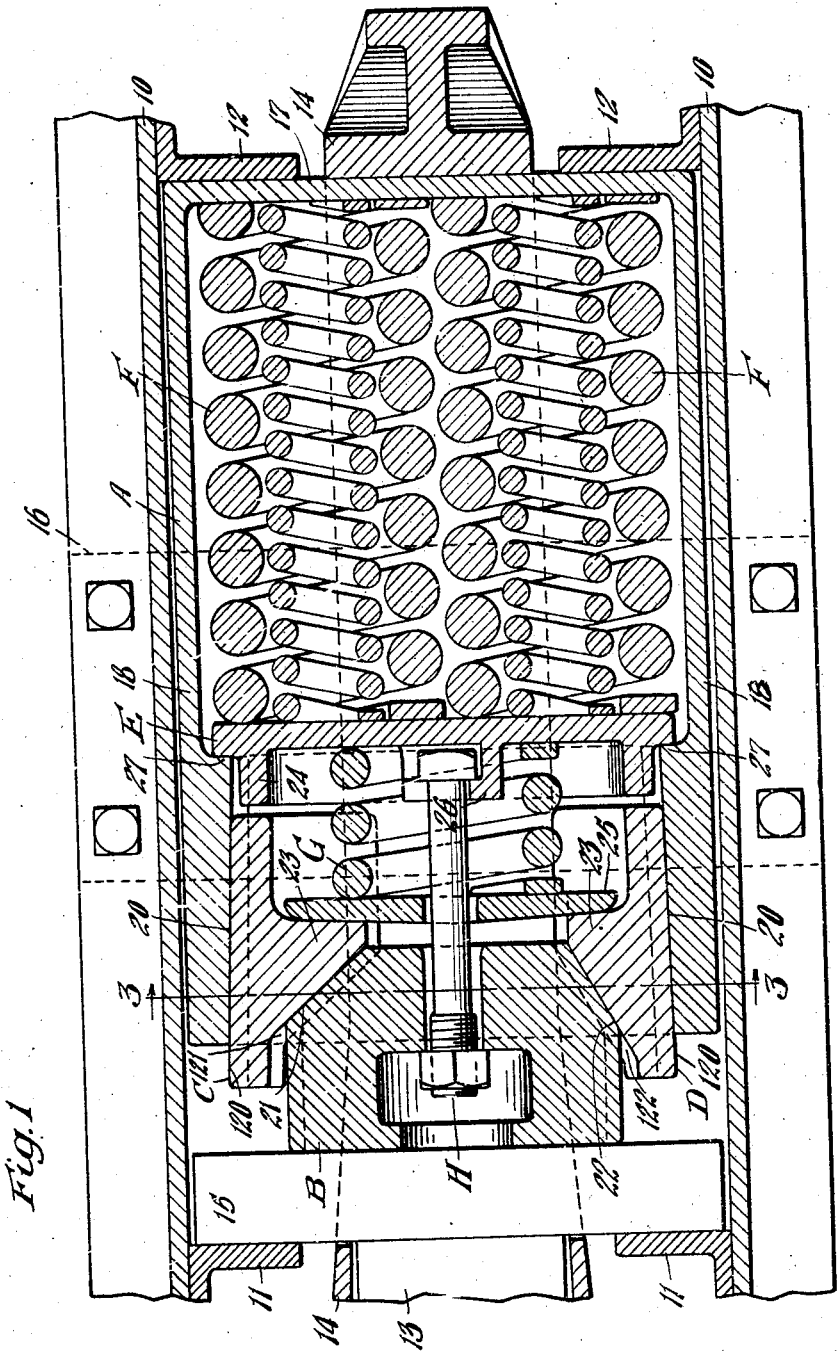

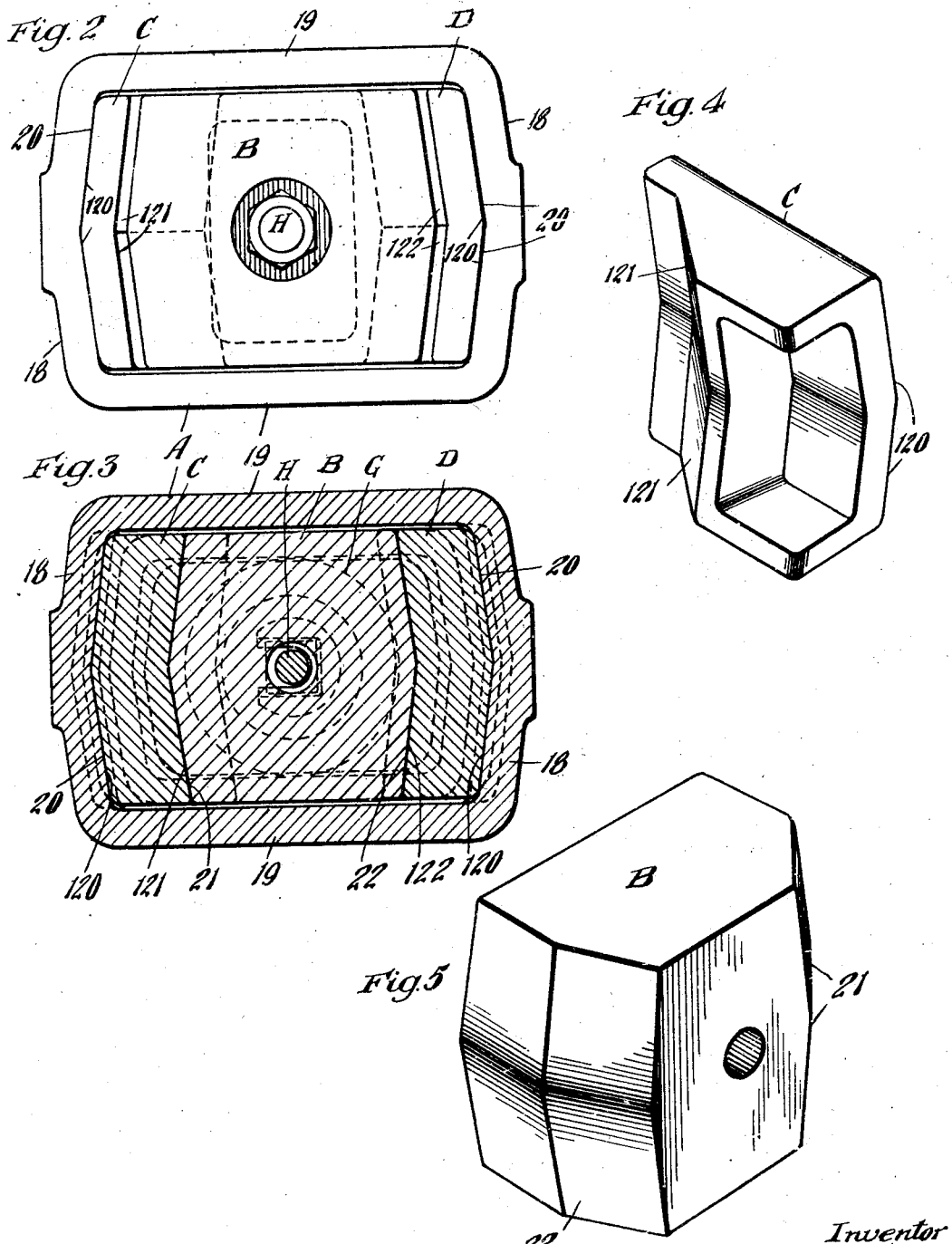

1,692,253

UNITED STATES PATENT OFFICE.

FREDERICK F. ERICKSON, OF KENMORE, NEW YORK, ASSIGNOR TO W. H. MINER, INC., OF CHICAGO, ILLINOIS, A CORPORATION OF DELAWARE.

FRICTION SHOCK-ABSORBING MECHANISM.

Application filed December 18, 1926. Serial No. 155,576.

This invention relates to improvements in friction shock absorbing mechanisms.

One object of the invention is to provide a friction shock absorbing mechanism especially adapted for railway draft riggings, including a column element provided with friction surfaces and a friction system co-operating therewith, wherein the friction system is movable longitudinally with respect to the column element and the arrangement of the parts is such as to maintain the friction elements centered, thereby preventing displacement of the parts and eliminating wear of the inactive surfaces of the column element.

Another object of the invention is to provide a friction shock absorbing mechanism of the character indicated, including a friction shell having a pair of opposed friction surfaces with which co-operates a friction system, including friction shoes and a wedge member, wherein means is provided for limiting relative movement of the shoes, wedge member and shell to a longitudinal direction, thereby preventing displacement of the parts and eliminating wear and scoring of the friction shell.

A more specific object of the invention is to provide a friction shock absorbing mechanism, including a rectangular cage having a friction shell section at one end thereof provided with opposed interior longitudinally extending friction surfaces, a friction system including friction shoes and a wedge member co-operating therewith, wherein provision is made for holding the wedge member and shoes centered with reference to the friction surfaces of the shell to maintain the parts of the friction system spaced from the remaining walls of the shell, thereby preventing contact with the latter and wear of the same.

Other objects and advantages of the same will more fully and clearly appear from the description and claims hereinafter following.

In the drawings, forming a part of this specification, Figure 1 is a horizontal, longitudinal, sectional view of a railway draft rigging showing my improvements in connection therewith. Figure 2 is a front end elevational view of the shock absorbing mechanism proper shown in Figure 1. Figure 3 is a transverse vertical sectional view corresponding substantially to the line 3—3 of Figure 1. And Figures 4 and 5 are detailed, perspective views respectively of a friction shoe and the wedge member employed in connection with my improved mechanism.

In said drawings, 10—10 indicate the usual channel-shaped center or draft sills of a railway car underframe, to the inner surfaces of which are secured front stop lugs 11—11 and rear stop lugs 12—12. The inner end of the drawbar is designated by 13 to which is operatively connected a yoke 14 of well known form. The shock absorbing mechanism proper as well as a front main follower 15 is disposed within the yoke. The yoke and the parts therewithin are supported in operative position by a detachable saddle plate 16 fixed to the draft sills.

My improved shock absorbing mechanism proper comprises broadly: A spring cage A; a wedge block B; two friction shoes C and D; a spring follower E; twin arranged main spring resistance elements F—F; a preliminary spring G; and a retainer bolt H.

The spring cage A is of substantially rectangular box-like form having a transverse vertical rear end wall 17, longitudinally disposed spaced vertical side walls 18—18 and horizontally disposed spaced top and bottom walls 19—19. The end wall 17 co-operates with the rear stop lugs 12 in the manner of the usual rear follower. At the forward end of the cage, the side walls 18 are provided with interior longitudinally disposed friction surfaces 20—20 converging inwardly of the mechanism. As most clearly shown in Figures 2 and 3, the friction surfaces 20 are of V-shaped groove formation for a purpose hereinafter pointed out.

The wedge B is in the form of a relatively heavy block having a flat outer end face bearing directly on the inner side of the main follower 15. At the inner end, the wedge block B is provided with a pair of inwardly converging wedge faces 21 and 22 disposed on opposite sides thereof. The wedge face 22 is disposed at a relatively keen wedge-acting angle with respect to the longitudinal axis of the mechanism, while the wedge face 21 is disposed at a relatively blunt releasing angle with respect to said axis. As clearly shown in Figures 2, 3 and 4, the wedge faces 21 and 22 are of V-shaped guide formation.

The friction shoes C and D, which are two in number, are disposed at opposite sides of the mechanism and co-operate with the friction surfaces 20 of the cage A. The friction shoes C and D are of similar design, except as hereinafter pointed out. Each of the shoes is provided with a lateral enlargement 23 on the inner side thereof having a wedge face on the forward side. The wedge face of the shoe C is designated by 121 and is correspondingly inclined to and co-operates with the wedge face 21 of the block B. The wedge face of the shoe D is designated by 122 and is correspondingly inclined to and co-operates with the wedge face 22 of the wedge B. The wedge faces of the shoes C and D are also of V-shaped groove formation so as to mate with the wedge faces 21 and 22 of the wedge block B. It will be evident that due to the interengaging arrangement of the wedge faces of the block B and the shoes C and D, relative movement of the wedge block and the shoes will be limited to a longitudinal direction, vertical displacement of these parts being effectively prevented by the V-shaped guide and groove arrangement of the faces. On the outer side, each friction shoe is provided with a longitudinally disposed friction surface 120 adapted to co-operate with the corresponding friction surface 20 of the cage A. The friction surfaces 120 are also of V-shaped guide formation so as to mate with the friction surfaces 20 of the cage, thereby limiting relative movement of the friction shoes and cage to a longitudinal direction and preventing vertical displacement of these parts.

From the preceding description, it will be evident that the wedge block B, friction shoes C and D, and the friction surfaces of the cage A are interlocked against vertical movement, thereby maintaining the friction system comprising the wedge and the friction shoes spaced from the top and bottom walls of the cage A at all times during the operation of the mechanism. As most clearly shown in Figures 2 and 3, an appreciable clearance is left between the top and bottom walls of the cage A and the top and bottom surfaces of the wedge and shoes. Scoring and wear of the top and bottom walls of the cage are thus entirely prevented.

The main spring resistance element F comprises twin arranged members, each member including an inner relatively light coil and an outer heavier coil. The coils of each unit have their opposite ends bearing respectively on the end wall 17 of the cage and the inner side of the spring follower E.

The spring follower E is in the form of a relatively heavy plate-like member having a peripheral flange 24 forwardly projecting therefrom and normally slightly spaced from the inner ends of the friction shoes C and D. A preliminary spring resistance G is interposed between the spring follower E and the friction shoes, the front end of the preliminary spring bearing on an auxiliary spring follower plate 25 having the front face thereof in engagement with the inner ends of the enlargements 23 of the shoes.

The parts are held assembled and of overall uniform length by the retainer bolt H which has the head end thereof anchored in an enlargement 26 on the front side of the spring follower E. The opposite end of the bolt is anchored to the wedge block B, the nut thereof being disposed within an opening of the block. Outward movement of the spring follower E is limited by engagement with the transverse shoulders 27 at the inner ends of the friction surfaces 20 of the cage A.

In assembling the mechanism, the springs F—F are first inserted within the cage and compressed sufficiently to permit insertion of the spring follower E in an inclined direction so as to clear the shoulders 27 on the side walls of the cage. When the spring follower E has been passed behind the shoulders 27, the springs are permitted to expand and the spring follower is forced outwardly against the shoulders 27. The friction shoes and wedge block are then assembled and secured in position by the retainer bolt H.

The operation of my improved shock absorbing mechanism, assuming a compression stroke, is as follows: The main follower 15 and cage A will be moved relatively toward each other, thereby forcing the wedge B and friction shoes C and D inwardly of the mechanism. During this action, due to the keen angled wedge faces of the wedge block and the shoe D, lateral pressure will be set up between the shoes and the friction surfaces of the shell. During the inward movement of the parts relatively high resistance will be offered, due to the friction created between the friction surfaces of the shoes and the cage A. The compression of the mechanism will continue either until the actuating force is reduced, or the main follower 15 comes into engagement with the front end of the cage A, whereupon relative movement of the parts will be arrested and the actuating force transmitted directly through the cage to the corresponding stop lugs on the draft sills, the cage acting as a solid column load transmitting member, preventing the main springs from being unduly compressed.

During release, the expansion of the springs F will carry the friction shoes and wedge block outwardly, release of the parts being facilitated by the relatively blunt co-operating wedge faces of the wedge block and the shoe C.

Outward movement of the spring follower E will be limited by engagement with the shoulders 27 on the cage A and outward movement of the wedge will be arrested by the retainer bolt H which is anchored to the spring follower E. By providing the inter-engaging V-shaped co-operating guide and groove formation of friction surfaces and wedge faces on the parts of the mechanism, the parts of the friction system are maintained against relative vertical displacement and the friction system as a whole is also maintained against vertical displacement with respect to the cage. The usual wear encountered in friction shock absorbing mechanisms of this type, due to the parts dragging on either the top or bottom walls of the rectangular cage, is thus entirely eliminated and the life of the mechanism greatly prolonged.

Although the friction wedge system has been illustrated as provided with blunt and keen wedge faces, it will be evident that my improvements are adapted equally to wedge friction systems in which the co-operating wedge faces are all disposed at the same angle with respect to the longitudinal axis of the mechanism.

While I have herein shown and described what I now consider the preferred manner of carrying out my invention, the same is merely illustrative, and I contemplate all changes and modifications that come within the scope of the claims attached hereto.

I claim:

1. In a friction shock absorbing mechanism, the combination with a column element; of friction shoes; said shoes and column having co-operating sets of friction surfaces, said shoes being slidable lengthwise of said column, said column also having additional surfaces; a wedge pressure transmitting block, said block and element being relatively movable longitudinally of the mechanism, said block and shoes having co-operating sets of wedge faces, said sets of co-operating friction surfaces and sets of co-operating wedge faces being of guide and groove formation confining said wedge block, shoes and column element to relative longitudinal movement only whereby said additional surfaces are maintained inactive; and spring resistance means yieldingly opposing relative longitudinal movement of the column element and shoes.

2. In a friction shock absorbing mechanism, the combination with a spring cage having friction shell means at the forward end thereof, presenting interior opposed friction surfaces; of a spring resistance within the cage; friction means adapted to receive the actuating force, including a wedge element and co-operating wedge friction members, said friction means and cage being movable relatively toward and away from each other; said friction members being interposed between the wedge element and friction surfaces of the shell, said wedge element and friction members having interengaging wedge faces limiting movement of the wedge and shoes to a direction lengthwise of the mechanism, said shoes having friction surfaces interengaging the friction surfaces of the shell means and limiting movement of said shoes to a direction lengthwise of the shell.

3. In a friction shock absorbing mechanism, the combination with a friction shell having opposed interior V-shaped friction surfaces; of a pair of friction shoes having V-shaped friction surfaces co-operating with said shell friction surfaces; a wedge block, said wedge block and shoes having co-operating V-shaped wedge faces, said wedge and shell being relatively movable toward and away from each other; and spring resistance means opposing inward movement of the shoes.

4. In a friction shock absorbing mechanism, the combination with a friction shell of substantially rectangular cross-section, said shell being provided with interior friction surfaces on the opposite sides thereof; of a pair of friction shoes having friction surfaces co-operating with said shell friction surfaces; a wedge block, said wedge block and shoes having co-operating wedge faces, said wedge block, shoes and shell being interlocked to limit movement of the parts to a direction longitudinal of the mechanism; and spring resistance means yieldingly opposing inward movement of the shoes.

5. A friction shock absorbing mechanism comprising: a column-acting member having longitudinally extending, oppositely disposed friction surfaces and intervening nonfriction surfaces; a spring resistance; and a plurality of friction wedge elements co-operable with said member, all of said elements being bodily movable lengthwise of said member and some of said elements having friction surfaces slidable lengthwise on the friction surfaces of said member, the cross sectional contour of all engaging sets of surfaces of said member and friction wedge elements being of general guide and groove formation, whereby to prevent relative shift between said member and any of said elements deviating from the path of longitudinal movement thereof in a direction transverse to a line extending between said oppositely disposed friction surfaces of said member.

6. A friction shock absorbing device including: a friction shell having interior, longitudinally extending, opposed friction surfaces and intervening nonfriction surfaces; a spring resistance; and a plurality of friction wedge elements, all longitudinally bodily movable relative to said shell, some of said elements having friction surfaces slidable lengthwise on the shell friction surfaces, the cross sectional contour of each set of said friction surfaces being of general guide and groove formation, whereby to prevent shift of said elements toward a nonfriction surface, each of said elements also having means co-operable with its corresponding adjacent element restraining relative shift between any of said elements toward a nonfriction surface.

In witness that I claim the foregoing I have hereunto subscribed my name.

FREDERICK F. ERICKSON.